MAGNETIC CORE CIRCUITS

Filed May 31, 1957

Inventor
Richard K. Richards
by Robert S. Toperzer
Atty.

May 3, 1960 R. K. RICHARDS 2,935,738

MAGNETIC CORE CIRCUITS

Filed May 31, 1957 10 Sheets-Sheet 2

Inventor
Richard K. Richards
by Robert S. Toperzer
Atty.

May 3, 1960 R. K. RICHARDS 2,935,738

MAGNETIC CORE CIRCUITS

Filed May 31, 1957 10 Sheets-Sheet 3

Inventor
Richard K. Richards
by Robert S. Toperzer
Atty.

Inventor
Richard K. Richards
by Robert S. Topezer
Atty.

May 3, 1960 R. K. RICHARDS 2,935,738

MAGNETIC CORE CIRCUITS

Filed May 31, 1957 10 Sheets-Sheet 5

Inventor
Richard K. Richards
by Robert S. Toperzer
Atty.

Inventor
Richard K. Richards
by Robert S. Toperzer
Att'y.

Inventor
Richard K. Richards
by Robert S. Toperzer
Atty.

Inventor
Richard K. Richards
by Robert S. Toperger
Atty.

May 3, 1960 R. K. RICHARDS 2,935,738

MAGNETIC CORE CIRCUITS

Filed May 31, 1957 10 Sheets-Sheet 9

Inventor
Richard K. Richards
by Robert S. Toperzer
Atty.

May 3, 1960 R. K. RICHARDS 2,935,738

MAGNETIC CORE CIRCUITS

Filed May 31, 1957 10 Sheets-Sheet 10

Inventor
Richard K. Richards
by Robert S. Toperzer
Atty.

2,935,738

MAGNETIC CORE CIRCUITS

Richard K. Richards, Wappingers Falls, N.Y.

Application May 31, 1957, Serial No. 662,653

14 Claims. (Cl. 340—174)

This invention relates to magnetic core circuits of the type used in digital computing and processing machines, and in particular it relates to improved versions of such circuits.

Most electronic digital computers now in service employ exceedingly large numbers of vacuum tubes which, as is well known, are not only costly, but create serious problems of reliability, heat dissipation and size to name just a few. In order to avoid these problems, there have been proposed various magnetic core circuits adapted to perform many of the functions of the vacuum tubes in digital computer applications. These core circuits have not been used as extensively as they might be otherwise, however, because of certain disadvantages which they all have in common.

In particular, the signals or binary digits (1's and 0's) transmitted from one individual circuit to another in a digital machine are transformed in various ways in the course of the computations. With any of the previously known types of magnetic core circuits it is necessary when shifting a 1 from one individual circuit to the next that there be some form of amplification so that the identity of the 1 can be maintained when a shift is made through a relatively large number of individual circuits. However, when a 0 is being shifted along the same path, it is necessary that the amplification factor be less than unity so that a 0-signal is not gradually amplified to a value which will cause the incorrect indication of a 1. To provide this effect in the previously known magnetic core circuits it is required that the amplification factor be nonlinear with respect to signal amplitude, and more specifically the amplification factor must be greater than unity for the relatively large amplitude 1-signals and less than unity for the relatively small amplitude 0-signals. This will produce the desired effect, however, only if the properties of all cores and other components are uniform and stable. Also, the amplitudes of all clock pulses and binary digit signals must be held to within very close limits, and the cores must have hysteresis loops which have a high degree of rectangularity. If these requirements are not met, the circuits will be unreliable and will cause errors.

Another disadvantage of previously known magnetic core circuits for digital computers is the complex nature of their adaptation to the performance of logical functions. As is well known in the digital computer art, logical functions can all be expressed as combinations of "and" functions, "or" functions, and inversions together with some form of delay or storage to handle the time element in computers. Although the degree of difficulty involved in obteaining various combinations of logical functions differs, in general "and" functions can be obtained in a reliable manner only by clumsy combinations of the other functions. Also it is impossible to obtain a function of more than one basic type when shifting from one circuit to the next. For example, an "and-to-or" function requires at least two steps of shifting.

In addition, the duration and amplitude of the driving pulses are critical, and the load imposed on the driving circuits varies according to the combination of 0's and 1's that happen to be present in the core circuits on any given step of operation.

Accordingly, one object of this invention is to provide a set of magnetic core circuits for digital computing machines and the like where the successful operation of the circuits is not critically dependent upon the amplification factor, and where large amplification factors can be advantageously utilized regardless of the values of the binary digits being shifted from one individual circuit to the next.

Another object of this invention is to provide core circuits wherein the hysteresis loops of the magnetic cores can be far from rectangular in shape.

Another object is to provide core circuits where an appreciable variation in component properties from one unit to the next can be tolerated.

Another object is to provide a magnetic core logic system which is adapted to perform complicated logical functions in a manner which lends itself better to simple design procedures and which is more easily understood.

Another object is to provide magnetic core circuits whereby complex logical functions can be performed in one step of shifting.

Another object is to provide magnetic core logical circuits wherein the amplitude and duration of the driving pulses are not critical provided certain minimum requirements are met.

Another object is to provide magnetic core logical circuits which produce a constant and uniform load on the driving circuits regardless of the particular combination of binary digits that is present.

Still another object of the invention is to eliminate the tendency for digits to be shifted in the wrong direction when shifting from one magnetic core to the next.

The various objects which were cited, as well as other objects of the invention will become apparent from the following description of the accompanying drawings, which disclose by way of examples, the principles of the invention and the best modes which have been contemplated of applying these principles.

The major components used in the circuits according to the present invention are generally known by the name of "magnetic cores." A magnetic core usually consists of a toroidal-shaped piece of magnetic material on which one or more windings have been placed. The turns of each winding loop through the toroid so that the magnetic flux created by a current in any given winding will pass around the toroid in a closed path through the magnetic material. However, this invention is not restricted to cores of this configuration. Any set of windings mutually inductively coupled through a magnetic medium having a hysteresis loop is, in principle, a satisfactory component for use according to this invention.

Figures 1, 2, 3, 4:
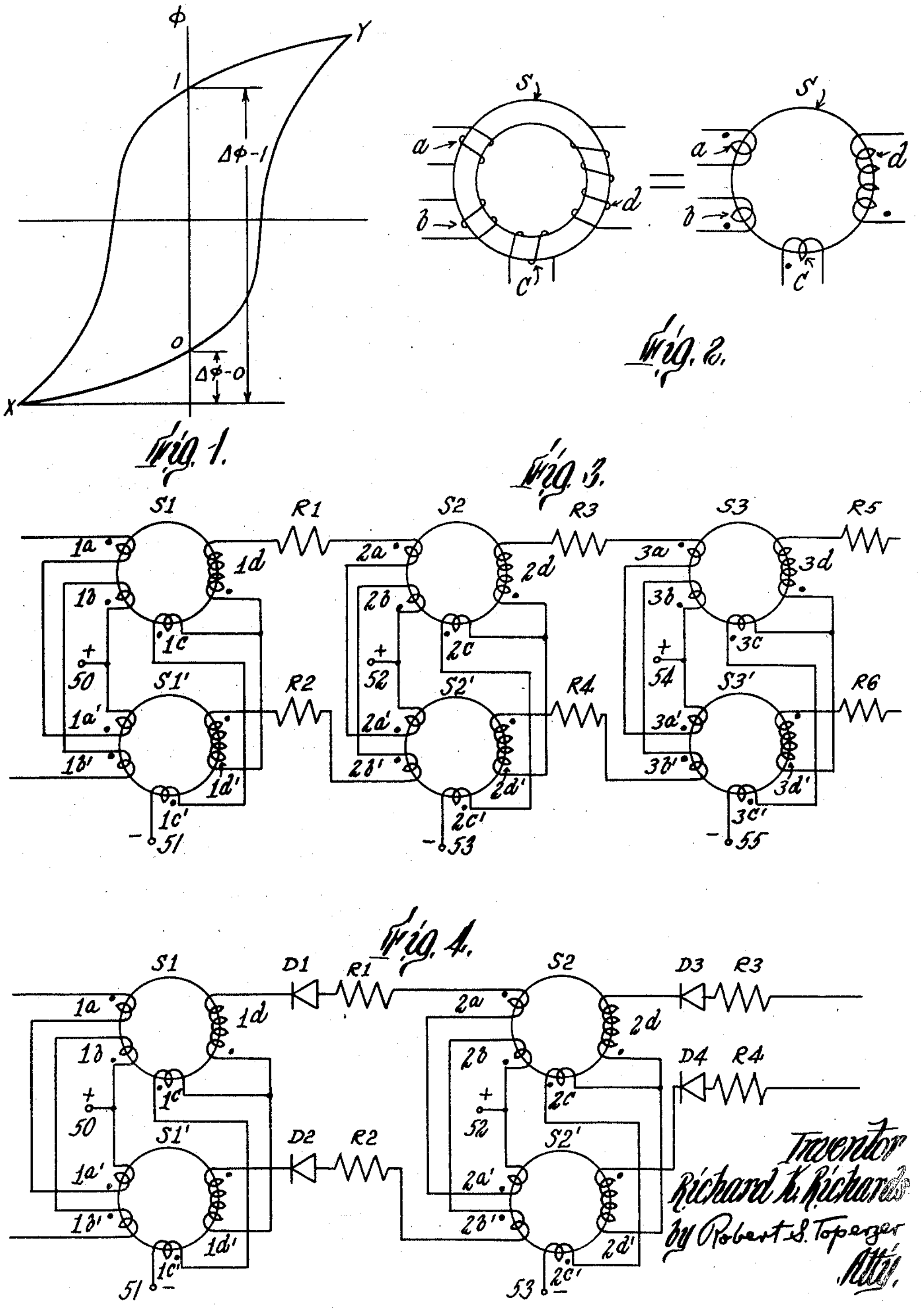
Fig. 1 shows a hysteresis loop of a magnetic core material suitable for use according to the invention.
Fig. 2 illustrates a notation that is used in the remainder of the drawings.
Fig. 3 shows a shifting circuit according to the invention.
Fig. 4 shows a modification of the circuit of Fig. 3.

Fig. 1 is a hysteresis loop representing flux in a core as a function of applied magnetomotive force (which may be abbreviated to M.M.F. and which is commonly represented by the letter H). In any given core, the applied M.M.F. is directly proportional to the product of the current in the winding supplying the M.M.F. and the number of turns in the winding. The M.M.F. is therefore commonly expressed in terms of ampere-turns. The flux, $\phi$, in the core is proportional to the product of the flux density (commonly represented by the letter B) and the area. Of course, when the cores are first manufactured, they are usually unmagnetized, but after one step of usage they become magnetized in one direction or the other so that the state of the core is always represented by a point on the graph in Fig. 1. If a large M.M.F. in one direction, say the direction indicated by the right-hand half of the figure, is applied, the state of the core is represented by point Y in the figure. If this M.M.F. is removed, the state of the core will be represented by point 1 in the figure. The vertical distance from this point to the origin of the graph indicates the amount of residual flux in the core. Similarly, if a large M.M.F. is applied in the opposite direction, the state of the core will correspond to point X, and when this M.M.F. is removed the state will be as indicated by the point designated 0. The core is said to "store" a binary 1 or a 0 according to whether the last applied M.M.F. was in a direction to the right or to the left, respectively, in the figure.

When the amount of flux in a core is changed as a result of a current change in any given winding, a voltage will be induced in all other windings on the core. The instantaneous value of this induced voltage is proportional to the rate of change of flux and to the number of turns on the winding. For a given value of applied M.M.F., the rate of change of flux will be approximately proportional to the magnitude of the flux change. In particular, in Fig. 1 if the core initially is in the 1 state, and an M.M.F. is applied which changes the state of the core to point X, the change in flux will correspond to the vertical distance indicated as $\Delta\phi$—1. On the other hand, if the core initially contains a 0, the flux change will correspond to $\Delta\phi$—0. The magnitudes of the induced voltages will be approximately proportional to these respective distances in the two cases. It is these two voltages which are the most important in the operation of the circuits to be described although certain other voltages will be induced in certain other instances. For example, when the applied M.M.F. is removed and the state of the core changes from point X to point 0, a voltage of opposite polarity and of magnitude corresponding to the distance $\Delta\phi$—0 will be induced. Also, similar voltages will be induced when an M.M.F. is applied in the opposite direction and the core is set to the 1 state.

For best results it is preferred that the hysteresis loop be so shaped that the distance $\Delta\phi$—0 in Fig. 1 be very small in comparison with the distance $\Delta\phi$—1. In other words it is desirable that the portion of the loop between points X and 0 and the portion of the loop between Y and 1 be as close as possible to being parallel to the M.M.F. axis of the figure. However, the principle of operation of the circuits of this invention does not necessarily require that the hysteresis loop have this characteristic. Further, there are substantially no requirements at all on the shape of the hysteresis loop between points X and 1 and between points 0 and Y.

The left-hand part of Fig. 2 shows a magnetic core S with four windings *a*, *b*, *c* and *d*. The same core and four windings are portrayed with a simplified schematic notation in the right-hand part of the figure. The important feature of the notation lies in the method of indicating the polarity of the windings. A dot is placed near one terminal of each winding. This terminal of the winding will be called the "dot terminal" and the other terminal will be called the "no-dot terminal." The convention to be assumed in the remainder of the drawings is that a current in a winding produces an M.M.F. which tends to set the core to 1 if the direction of current flow is such that it enters the dot terminal and flows through the winding to the no-dot terminal. To produce current flow in this direction, the voltage applied to the winding is with the relatively positive potential at the dot terminal and with the relatively negative potential at the no-dot terminal. If current flows in the opposite direction as a result of an applied voltage of a polarity which causes the relatively positive potential to be applied at the no-dot terminal, the resulting M.M.F. will tend to set the core to 0. As is usually the case with magnetic devices of this category, the actual direction of the flux (clockwise or counterclockwise) is of no consequence provided the relative polarities of the various windings are correctly observed. Also, as is common practice with magnetic devices, the number of turns in the windings does not necessarily bear any relation to the number of turns in the symbols or in the drawings; the circuits of the invention can be made to operate with widely varying numbers of turns on the various windings.

The polarity of an induced voltage in a winding can be determined from Lenz's law, which states that any current flow resulting from an induced voltage is in the direction for creating and M.M.F. which opposes the flux change. From this law it may be determined that when a core is being set to 0, the induced voltage in a winding will have the polarity represented by a relatively positive potential at the no-dot terminal and a relatively negative potential at the dot terminal. That this polarity satisfies Lenz's law can be understood by observing that a resistor or other load connected across the terminals of the winding will draw current which flows through the winding with the current entering the dot terminal, and current in this direction tends to set the core to 1 in opposition to the M.M.F. tending to set the core to 0. The polarity of the induced voltage when the core is being set to 1 is such that the relatively positive potential appears at the dot terminal.

It will be observed in Fig. 3 and in subsequent embodiments of the invention that all cores occur in pairs. The two cores in any pair are designated by S*n* and S*n*′ where *n* is an integer that refers to the specific pair. In the explanations of the various circuits reference will be made to the cores by pairs such as "the S*n* pair" or more specifically "the S3 pair," for example. It should be understood that the two cores, S3 and S3′, are the ones to which reference is being made in this example. Also it should be assumed that the cores and related components are substantially symmetrical; that is, that the two cores in a pair are approximately alike, that the corresponding windings have the same number of turns, and that the resistors, condensers, and other components have the same nominal values in the two halves of a circuit.

In the operation of the various circuits of the invention, binary digits are shifted from one core pair to another in ways to be described and in accordance with the logical functions to be performed. In all instances, when a core pair stores the binary digit, 1, both cores S*n* and S*n'* of the pair are at the state designated by 1 in Fig. 1. Conversely, when the core pair stores a binary 0, cores S*n* and S*n'* are in the 0 state. When a binary digit is shifted from one core pair to another, the S*n* core of the pair from which the digit is being shifted is set to 0 and the S*n'* core is set to 1 by a single driving pulse which is applied in a manner to produce the shifting action. Also in each of the circuits to be described, the cores in a pair to which a digit is being shifted will have been driven to 0 and 1 as aforementioned by the time that the shifted digit arrives. However, as will be observed from the functioning of the circuits it is not necessary that the cores to which a digit is being shifted be in any particular state, and in special applications of the shifting circuits this feature is an advantage.

Another point that should be observed is that the relation of the S*n* core of a pair to the S*n'* core, as regards the notation of flux direction or magnetic state 1 and 0, is essentially a matter of definition since the orientation of the cores in space is immaterial and hence unspecified. Accordingly, a core pair might be said to store a 1 when the S*n* core is in the 1 state, for example, and the S*n'* core is in the 0 state provided that the sense of the transfer signal or pulse is such that both cores are driven to 0 thereby. What is significant is that each core of a pair is set to 1 or 0 according to the binary sense of the digit signal or pulse which it is desired to store therein, and that the state of only one of the cores is reversed by a transfer signal of fixed sense when it is desired to shift a digit out of the core pair. Hereafter only the first-mentioned notation will be employed however, so that the invention may be understood more simply.

For a more specific explanation of the shifting mechanism reference will be had to Fig. 3. Assume that core pair S2 contains a binary digit that is to be shifted to core pair S3. To shift the digit, a driving pulse is applied to terminals 53 and 54 with the relatively positive potential appearing at 54. There are two apparent paths for the driving current to flow. One path is from terminal 54 through winding 3*b* on core S3, through winding 3*b'* on core S3', through resistor R4, through winding 2*d'* on core S2', and then through windings 2*c* and 2*c'* in series on core pair S2 to terminal 53. The other path is from terminal 54 through winding 3*a'* on core S3', through winding 3*a* on core S3, through R3, through winding 2*d* on core S2, and through windings 2*c* and 2*c'* in series on core pair S2 to terminal 53. Observe that in either case the path is through 2*c* and 2*c'* and that the current flows through these windings in a direction such that the resultant M.M.F.'s tend to set S2 to 0 and S2' to 1. The magnitude of the driving current is selected to be sufficiently large that the S2 cores are driven to the states represented by points X and Y in Fig. 1 and therefore these cores are caused to be set to 0 and 1, respectively at the termination of the driving pulse.

Assume for example that the digit to be shifted from the S2 pair to the S3 pair is a 1. When the driving pulse is applied, current from both of the current paths described above will flow into the no-dot terminal of winding 2c and out of the no-dot terminal of winding 2*c'*, reversing the state of core S2 (from 1 to X in Fig. 1) but producing only a minor flux change (from 1 to Y in Fig. 1) in core S2'. As a result a voltage corresponding to $\Delta\phi$—1 in Fig. 1 will be induced in winding 2*d* and a voltage corresponding to $\Delta\phi$—0 will be induced in winding 2*d'*. These voltages will oppose the flow of driving current in the respective paths. Since the magnitude of the voltage induced in 2*d* is the greater, however, more than one half of the driving current will flow through the opposite path. Observe that the current flowing through the 2*d'* path enters the dot terminals of both 3*b* and 3*b'* and hence tends to set both cores of the S3 pair to 1. Conversely, current through the 2*d* path enters the no-dot terminals of 3*a* and 3*a'* and hence tends to set these same cores to 0. Since the current through the 2*d'* path is the greater, the net M.M.F. created in the S3 pair will be in the direction tending to set them both to 1. If the amplitude of the driving current is sufficiently great and if the number of turns on the various windings are appropriately determined, the net M.M.F. in the S3 pair of cores will be sufficiently great to set the S3 pair to 1. The binary 1 in the S2 pair will then have been shifted to the S3 pair.

If the S2 pair had contained a binary 0, the shifting mechanism would have been the same except that the greater current would have passed through the path that includes 2*d*, and cores S3 and S3' would have been set to 0.

An important advantage of the shifting circuit is realized when the duration of the driving current is greater than necessary to effect the shifting function. After the flux change in the cores of the S2 pair has been completed, there will be no further induced voltage in 2*d* or 2*d'*. The current will then divide equally between the two paths and will produce a net M.M.F. of zero in each of the two cores in the S3 pair. Therefore there will be no further effect on the S3 cores, and the driving current can be maintained indefinitely without adverse effect on the shifting mechanism. Since the functioning of the shifting circuit is dependent only on the sign of the difference in currents in the two paths and is not dependent upon the magnitude of the difference (provided, for practical reasons, that the magnitude of the difference is greater than a certain minimum), a wide variation can be tolerated in the characteristics of the cores and in the amplitude and duration of the driving pulse.

In principle, resistors R3 and R4 in the shifting circuit between the S2 and S3 pairs are not essential, but they serve two important functions. One function is to insure that the resistances of the two paths are equal. If only the resistance of the windings, the connecting wire, and the various connections (probably soldered connections) were present in the paths, a poorly made connection could cause a relatively large change in the fraction of the current passing through that path. A more important purpose of the resistors is to prevent unduly large circulating currents in the loop formed with the two paths. For example, when shifting a binary 1 from the S2 pair to the S3 pair, the voltage induced in 2*d* tends to cause current to flow in the loop consisting of 2*d*, R3, 3*a*, 3*a'*, 3*b*, 3*b'*, R4, and 2*d'* in that order. In the absence of R3 and R4, the magnitude of this circulating current might be great enough to cause an excessive load on the driving circuit because of the transformer action between 2*c* and 2*d*. Another instance where the resistors prevent unduly large circulating currents is when a binary digit is being shifted from the S3 pair to some other cores not shown in Fig. 3. When one or the other of the cores in the S3 pair is being magnetized by the driving pulse for that pair, voltages are induced in either the *a* and *b* windings or the *a'* and *b'* windings depending on the initial states of the cores. The polarities of the induced voltages are series-aiding and tend to cause current flow that in the absence of the resistors produces an excessive load on the driving circuit and also produces unwanted M.M.F.'s in the S2 pair of cores. A third instance where the resistors prevent unduly large circulating currents is when a binary digit is being shifted from the S1 pair to the S2 pair. When the cores in the S2 pair are being set, a voltage is induced in the 2*d* winding if the digit is a 1 or in the 2*d'* winding if the digit is a 0. In either case the voltage tends to create a current in the same loop and thereby cause an unwanted load on the shifting circuit. The magnitude of this circulating current is substantially diminished by the presence of the resistors.

When the driving pulse for shifting between the S2 pair and the S3 pair is terminated, the states of the cores in the S2 pair change from point X to point 0 and from point Y to 1, respectively in Fig. 1. Equal voltages (both relatively small) are then induced in the 2*d* and 2*d'* windings, but these voltages oppose each other in the loop in the shifting circuit and cause no important difficulty. It is also to be noted that when a binary 0, for example, is being shifted from the S2 pair to the S3 pair, the current flowing through 2*d* causes a voltage to be created across the terminals of 2*d*. This voltage is ordinarily relatively small and is created because of the small amount of self inductance in the windings where this self inductance is a result of incomplete saturation of the cores. This voltage is in addition to any induced voltage created by current through the 2*c* winding. Both voltages must be recognized in the detailed design of the shifting circuit, but this added voltage does not affect the principles of operation.

After the shifting of the binary digit from the S2 pair to the S3 pair has been completed and after the driving pulse applied to terminals 53 and 54 has been terminated, a digit may be shifted from the S1 pair to the S2 pair. In this case the driving pulse is applied to terminals 51 and 52. The mechanism of the shifting operation is the same as before. Ordinarily, binary digits would be stored in alternate core pairs in the shifting circuit in Fig. 3. For example, if the digits are in pairs S2, S4, S6, etc., they may be simultaneously shifted to pairs S3, S5, S7, etc., respectively. Then on a subsequent simultaneous operation they may be shifted to pairs S4, S6, S8, etc., respectively.

It may be observed that when shifting a binary digit from one core pair to the next such as from the S2 pair to the S3 pair, voltages will be induced in the 2*a* and 2*b* windings or in the 2*a'* and 2*b'* windings, as the case may be, and that this induced voltage will tend to cause current flow in the circuit loop that includes the 1*d* and 1*d'* windings. This current flow may tend to set the cores in the S1 pair to undesired states, but by choosing a suitably large turns ratio between the *d* and the *a* and *b* windings or by choosing a suitably large value of resistance for the resistors (R1, R2, R3 etc.), the amount of current from this source can be held to a sufficiently low value to prevent a shifting of digits in the reverse direction.

The circuit in Fig. 4 is identical to the circuit in Fig. 3 except that diodes D1 and D2 have been inserted in series with the resistors R1 and R2 respectively. The diodes have a low forward resistance so that they offer no hindrance to the flow of driving current, but their back resistance is high which eliminates any circulating current in the loop composed of the two driving current paths. The reason is that one or the other of the two diodes will appear in the high resistance direction to any circulating current. For example, when a 1 is being shifted from the S1 pair to the S2 pair, the relatively large voltage induced in 1*d* will appear across diode D1 in the high resistance direction although the driving current will be able to flow through D2.

Another important function of the diodes is to eliminate all tendency to shift digits in the reverse direction. For example, when shifting a binary 1 from the S2 pair to an S3 pair (not shown), the voltage induced in the 2*a* and 2*b* windings will be ineffective to cause a current flow in the loop. In this case the relatively positive potential will appear at the no-dot terminals of 2*a* and 2*b*. Therefore, current in the loop is prevented because of the high back resistance of diode D1. The need for resistors R1 and R2 in the circuit of Fig. 4 is less acute than in the circuit of Fig. 3, but it is still desirable that the resistances of the two paths be made very nearly equal by means of the resistors in case the driving current is maintained after the shifting action is completed. Also the resistors effectively mask any differences which may exist in the resistances of the soldered connections and in the forward resistances of the diodes.

Several variations in the basic circuit of Fig. 4 are possible. One variation is to apply the driving pulse with the positive and negative polarities at terminals 51 and 52, respectively, instead of 52 and 51, respectively (when shifting from the S1 pair to the S2 pair). In the case of the circuit in Fig. 4, the diodes must be connected in the opposite directions from the direction shown in the figure. With either the circuit in Fig. 3 or the circuit in Fig. 4, the driving current will tend to set S1 to 1 and S1' to 0. If a 1 is being shifted, a voltage will be induced in winding 1*d'*, and this voltage will oppose the flow of current in the corresponding path. The greater part of the current will therefore flow through the opposite path (through 1*d*, R1, 2*a*, and 2*a'* to terminal 52) to set the S2 pair to 1.

Another variation in the circuits in Figs. 3 and 4 is to apply the driving pulse with the first-mentioned polarity but with the polarities of windings *d* and *d'* 00 reversed In this case the induced voltage aids instead of opposes the flow of current in the corresponding path. The shifting action takes place in substantially the same manner except that for a 1 or a 0 the current flows in the opposite path from the one indicated in the previous variations. (The polarities of the *a*, *b*, *a'*, and *b'* windings would normally be reversed to maintain the same notation with regard to 1's and 0's.) This variation is generally less desirable because the current flow in the *d* or *d'* windings in which a voltage is induced will be in the direction which tends to oppose the flux change produced by the *c* windings, and consequently a greater number of turns will be required for the *c* windings.

Still another variation of the circuits in Figs. 3 and 4 is to eliminate the resistors and use only the diodes. For reasons which have already been mentioned, this variation may require that the duration of the driving pulse be closely controlled, but the variation has the advantage that the voltage drop in the resistor need not be overcome by the induced voltage in the *d* or *d'* winding.

Further, a variation in the circuits in Figs. 3 and 4 is to eliminate the *b'* and *a* windings on each core pair. This variation has the advantage of one less winding per core, but the net M.M.F. in the cores to which a digit is being shifted is the result of the currents in the corresponding paths and not the difference in currents. This variation may be satisfactory in designs where the opposing voltage induced in the *d* or *d'* winding is sufficiently great to prevent all current flow in the corresponding path. The feature of being able to allow the driving current to remain an indefinitely long period of time is lost, however.

As will be apparent to those skilled in the art, combinations of the variations described above are also possible. Similarly it will be seen that these variations may be applied in a straightforward manner to many of the circuits to be described hereinafter.

Figure 5:
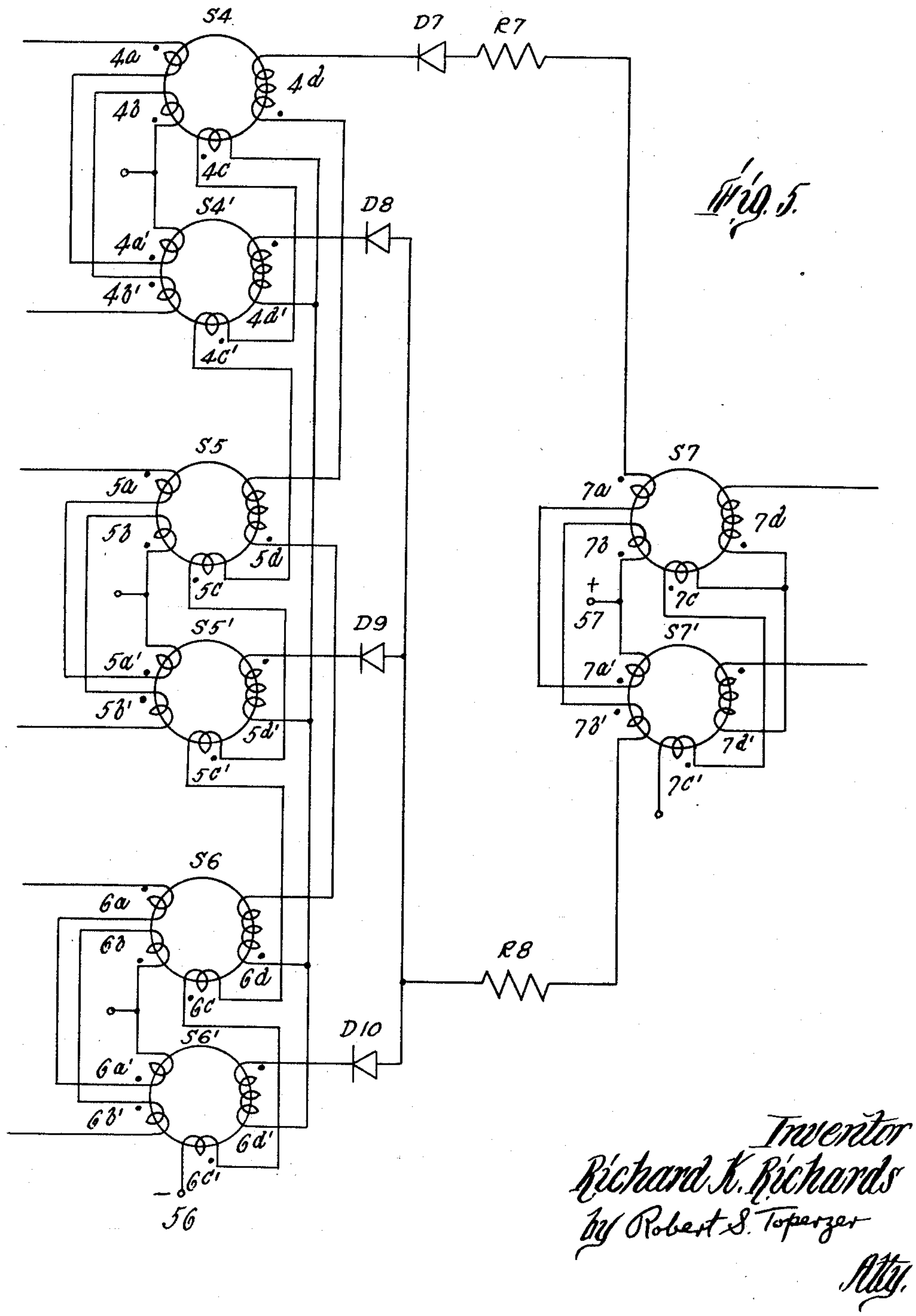
Fig. 5 shows an "or" circuit according to the invention.

In the "or" circuit of Fig. 5 binary digits are shifted from the S4, S5, and S6 pairs to the S7 pair. The circuit is so arranged that the S7 pair is set to 1 if a 1 is initially stored in the S4 pair "or" the S5 pair "or" the S6 pair (or in any two or in all three of these pairs). This circuit is characterized by the fact that the D windings of the S4, S5, and S6 pairs are fed in series through one path for the driving current and the *d'* windings are fed in parallel through the other path. The driving pulse is applied to terminals 56 and 57 with the relatively positive potential at 57. One path is from terminal 57 through 7*a'*, 7*a*, R7, D7, 4*d*, 5*d*, 6*d*, and then through the series connection of 4*c*, 4*c'*, 5*c*, 5*c'*, 6*c*, and 6*c'* to terminal 56. The other path is from terminal 57 through 7*b*, 7*b'*, R8, then through one or more of the branches consisting of D8 and $4d'$, of D9 and $5d'$, or of D10 and $6d'$, and then through the series connection of $4c$, $4c'$, $5c$, $5c'$, $6c$, and $6c'$ to terminal 56.

If all three of the binary digits to be combined in an "or" function are 0's, a relatively large voltage corresponding in magnitude to the magnitude of flux change $\Delta\phi-1$ in Fig. 1 will be induced in each of the $4d'$, $5d'$, and $6d'$ windings at the time of the driving pulse. A relatively small voltage will be induced in each of the $4d$, $5d$, and $6d$ windings. More than half of the driving current will therefore pass through the path which includes $7a'$ and $7a$ and the net effect will be to set the S7 core pair to 0.

If any one of the input binary digits is 1, a relatively large voltage will be induced in the $d$ winding of the corresponding core pair and this voltage will oppose the flow of driving current in the path that includes $7a'$ and $7a$. On the other hand, a relatively small voltage will be induced in the corresponding $d'$ winding so that only a small opposition to the flow of driving current will be present in at least one path that includes $7b$ and $7b'$. More than half of the driving current will then flow through this path and will set the S7 core pair to 1.

If two or all three of the input binary digits are 1, the opposing voltage in the path that includes the $d$ windings will be even greater, whereas the driving current can divide between the branches that include the corresponding $d'$ windings. The effect on the S7 pair will be substantially the same as when only a single binary digit was 1, therefore.

The diodes D7 through D10 in the circuit of Fig. 5 serve the same purposes as the diodes in Fig. 4. Diodes D8, D9, and D10 serve the additional purpose of blocking circulating currents in the individual branch paths when the induced voltages in the various $d'$ windings are not all the same. For example, if core S4' is being set to 0 as a result of the binary digit 0 being shifted into the S4 pair, a voltage will be induced in the $4d'$ winding. In the absence of the diodes, this voltage could cause a large circulating current in the loop consisting of the $4d'$ winding and the $5d'$ winding or in the loop consisting of the $4d'$ and the $6d'$ winding or in both of these loops. When considering the loop consisting of $4d'$ and $5d'$, for example, it may be observed that D8 blocks the flow of current in one direction around the loop and D9 blocks the flow of current around the loop in the opposite direction. Nevertheless, the diodes are all in the low resistance direction with respect to the flow of driving current from terminal 57 to terminal 56.

Although Fig. 5 shows a three-input "or" circuit, the circuit can be extended to provide for the combination of any number of binary digits in an "or" function. However, a practical limitation is encountered particularly if the hysteresis loop is such that the voltage corresponding to $\Delta\phi-0$ in Fig. 1 is an appreciable fraction of the voltage corresponding to $\Delta\phi-1$. This limitation arises from the fact that the $d$ windings are fed in series with the result that the net effective voltage in the corresponding path is the sum of the individual voltages, whereas the voltages do not add in the $d'$ windings because these windings are in parallel. With an unduly large number of windings in series, it could happen that the sum of the $\Delta\phi-0$ voltages exceeded the $\Delta\phi-1$ voltage, and improper operation of the circuit would result in the case where all input binary digits were 0.

By placing a larger number of turns on the $d'$ windings which are connected in parallel (the $4d'$, $5d'$, and $6d'$ windings in Fig. 5) the upper limit is extended with regard to the number of binary digits that can be combined in "or" fashion in one shifting circuit. However, the gain that can be achieved in this way is limited by the fact that all possible combinations of input signals must be considered. In particular, when one and only one of the input binary digits is a 1, the voltage induced in the series connection of the $d$ windings must be greater than the smallest of the voltages induced in the $d'$ windings. When multiple-input "or" circuits are involved, best operation is obtained with cores that have a hysteresis loop with a very small $\Delta\phi-0$ value.

Figure 6:
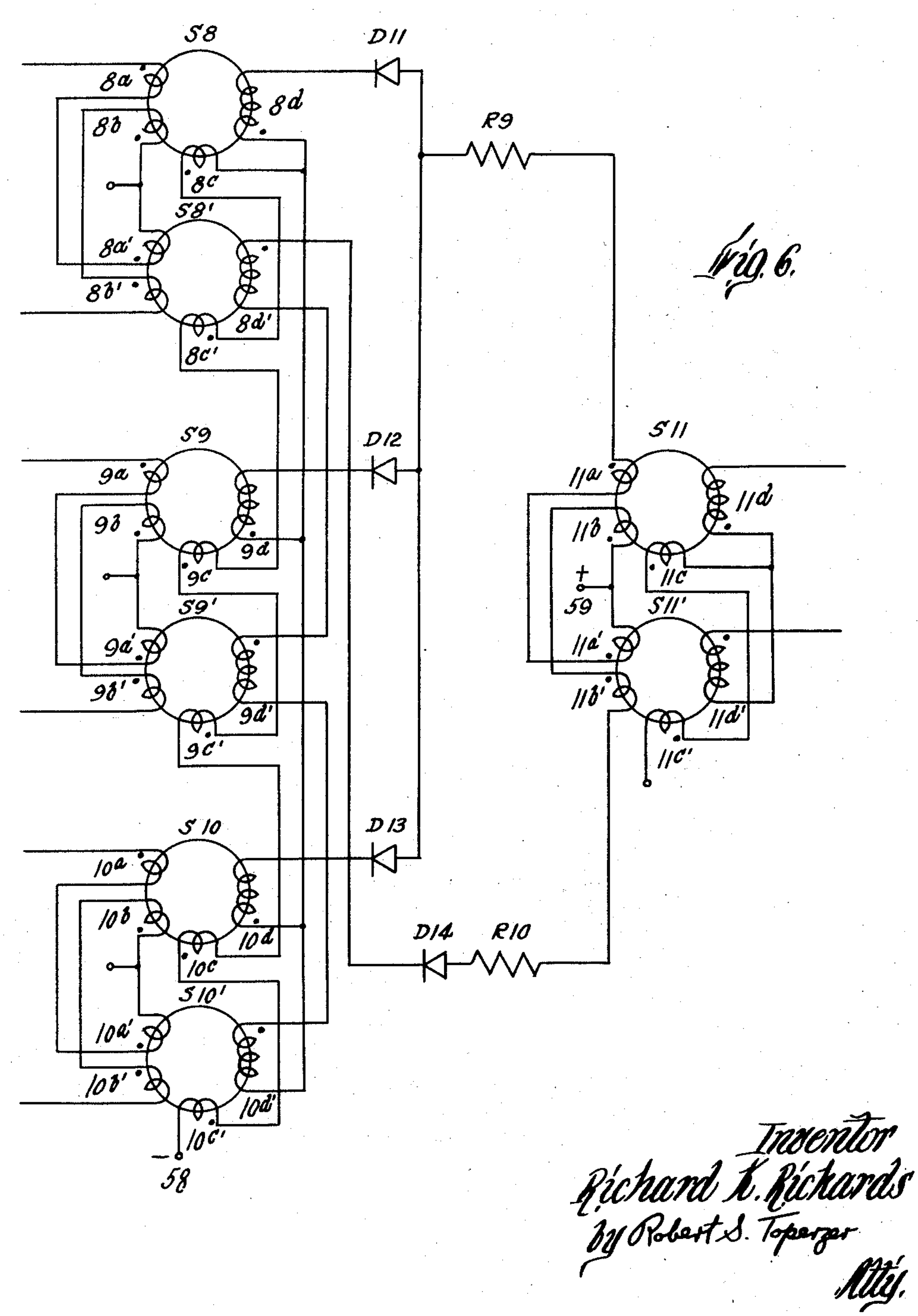
Fig. 6 shows an "and" circuit according to the invention.

The "and" circuit in Fig. 6 is similar to the "or" circuit in its method of operation except that in this case the $d$ windings are fed in parallel and the $d'$ windings are fed in series. The driving pulse is applied to terminals 58 and 59 with the relatively positive potential at 59. More than one half of the driving current will pass through the path that includes windings $11a'$ and $11a$ under all combinations of input binary digits except when all three of the digits stored in the S8, S9, and S10 pairs are equal to 1. This result is obtained because, if one or more of the digits is 0, a relatively large opposing voltage will be induced in the series connection of the $8d'$, $9d'$ and $10d'$ windings. The effect of the larger current in the $11a$ and $11a'$ path is to set the S11 core pair to 0. When all three of the input signals are 1, that is, when the digit in the S8 pair is 1 "and" when the digit in the S9 pair is 1 "and" when the digit in the S10 pair is 1, the larger opposing voltage will be induced in all of the $d$ windings but in none of the $d'$ windings so that more than half of the driving current will flow through the $11b$ and $11b'$ windings to cause the S11 pair to be set to 1.

Figure 7:
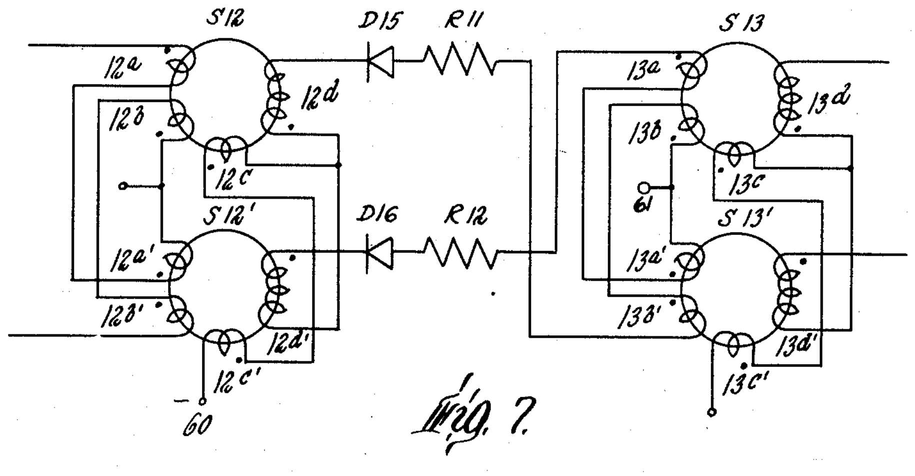
Fig. 7 shows an inverter according to the invention.

The operation of the inverter circuit illustrated in Fig. 7 is substantially the same as the operation of the shifting circuit in Fig. 4. The only difference is that the connections to the windings on the core pair to which the binary digit is being shifted have been reversed. The driving pulses are applied to terminals 60 and 61 with the relatively positive potential at terminal 61. With the connections as shown in the figure, more than one half of the driving current passes through the path that includes windings $13a'$ and $13a$ when core pair S12 contains a 1 at the time of the shift. This result is obtained because of the opposing voltage that is induced in $12d$. The effect in this case is to set the S13 pair to 0. The shifting operation has therefore effectively changed a 1 into a 0. Similarly, if core pair S12 contained a 0 at the time of the shift the opposing voltage induced in $12d'$ would cause more than half of the driving current to pass through the $13b$ and $13b'$ windings in a direction which causes the S13 pair to be set to 1. In this case a 0 has been effectively changed to a 1 by the shift. The circuit is called an inverter because the shifting operation "inverts" the value of the binary digit being shifted. In other words, a binary digit can have only one of two values, 0 or 1, and an inverter changes a given digit to its opposite value.

Figure 8:
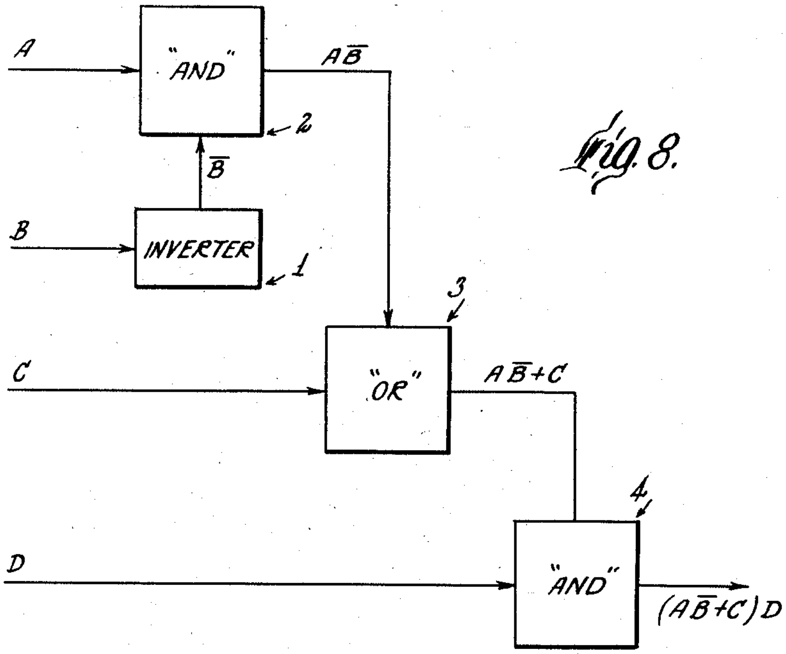
Fig. 8 is a block diagram of the logical function performed by the circuit in Fig. 9.

The block diagram in Fig. 8 illustrates the function which in Boolean algebra notation is designated by $(A\bar{B}+C)D$ where a "product" represents an "and" function, a "sum" represents an "or" function, and line over a symbol represents an inversion. For a more complete discussion of Boolean algebra notations, reference is made to chapters 2 and 3 of the book, "Arithmetic Operations in Digital Computers" by R. K. Richards. This book was published by the D. Van Nostrand Company in 1955.

Block 1 in Fig. 8 is an inverter. The input signal to this block is designated by B, and the output signal by $\bar{B}$. Signals A and $\bar{B}$ are combined in block 2 which performs an "and" function that produces a signal designated by $A\bar{B}$. Signal C is combined with $A\bar{B}$ in block 3 where an "or" function is performed. The output from block 3 is therefore $A\bar{B}+C$. Input signal D is combined with $A\bar{B}+C$ in block 4, which performs another "and" function so that the final output signal is $(A\bar{B}+C)D$. It may be said that the value of the output signal is 1 if A "and" not B are 1 "or" if C is 1 "and" if at the same time D is 1.

A more specific indication of the value of the output signal as a function of all possible combinations of input signals is set forth below.

| A | B | C | D | Output |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 0 |
| 0 | 1 | 1 | 0 | 0 |
| 0 | 1 | 1 | 1 | 1 |
| 1 | 0 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 0 |
| 1 | 1 | 0 | 1 | 0 |
| 1 | 1 | 1 | 0 | 0 |
| 1 | 1 | 1 | 1 | 1 |

It may be observed that those combinations of input signals for which the output is 1 are combinations which satisfy the requirements mentioned before.

Figure 9:
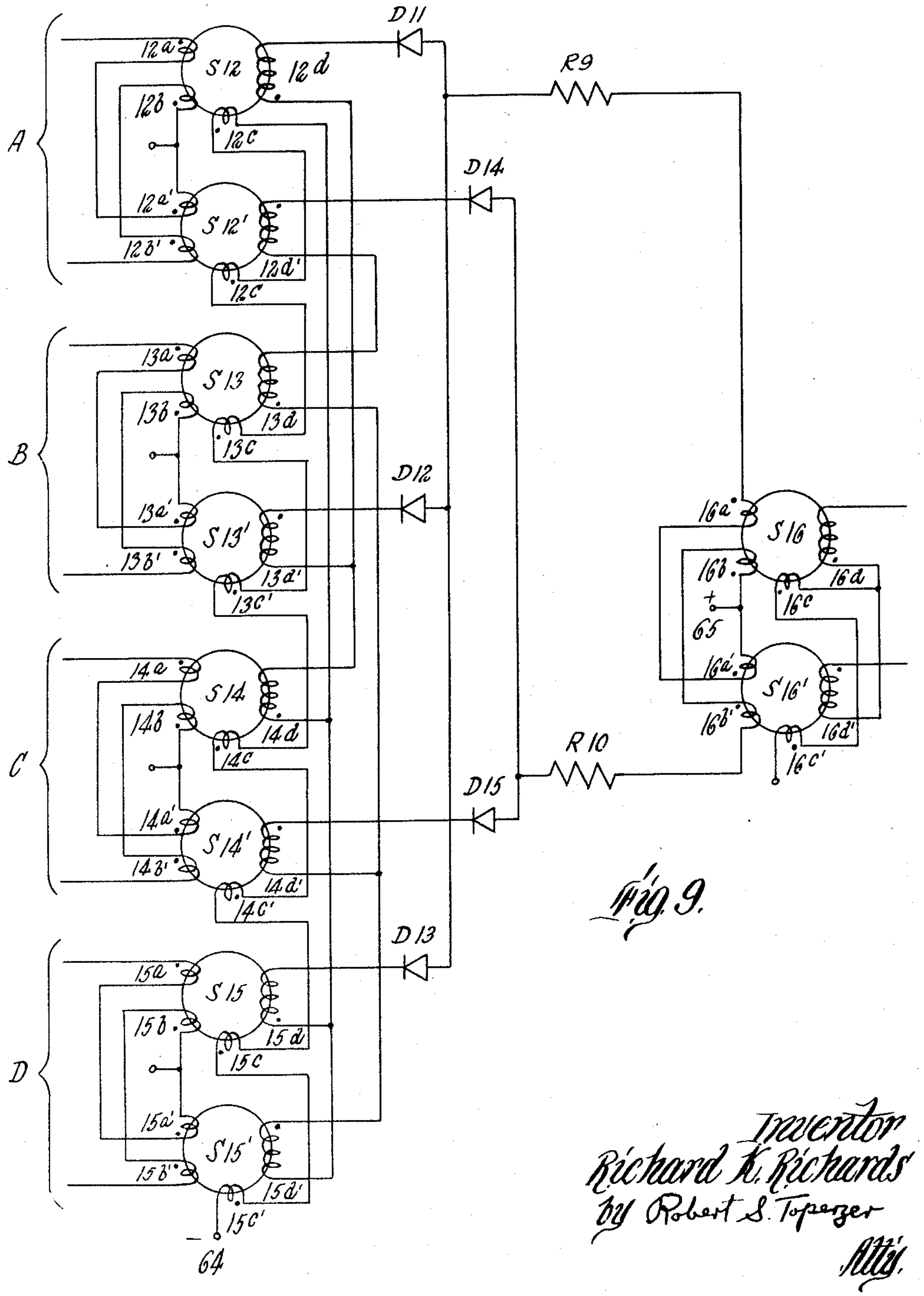
Fig. 9 shows, by way of example, a circuit to accomplish a complex logical function in one step of shifting according to the invention.

In Fig. 9 input signals A, B, C, and D are entered in core pairs S12, S13, S14, and S15, respectively, where they represent binary digits of corresponding values. When the digits in these four core pairs are shifted to core pair S16, the function $(A\bar{B}+C)D$ is performed so that the digit entered in pair S16 is a 1 or a 0 in accordance with the pattern set forth above. When performing a shifting operation a pulse is applied to terminals 64 and 65 in Fig. 9 with the relatively positive potential at terminal 65. The driving current has two possible paths open to it. One path passes through windings **16*a*' and 16*a* on cores S16' and S16, respectively, and through resistor R9. The other path passes through windings 16*b* and 16*b*'** on cores S16 and S16', respectively, and through resistor R10. The connections to the *d* and *d'* windings on the S12, S13, S14, and S15 pairs are made so that more than one half of the driving current will pass through the path that contains R10 when pair S16 is to be set to 1 and more than one half of the current will pass through the other path when the S16 pair is to be set to 0. In either case the driving current always passes through the series connection of windings **12*c*, 12*c*', 13*c*, 13*c*', 14*c*, 14*c*', 15*c*, and 15*c*'** in a direction which resets the unprimed core of each pair to 0 and the primed core to 1.

In the cases where the digit shifted into the S16 pair is to be a 1, the desired result obtains from the fact that the R9 path branches through the parallel combination of windings **12*d* and 13*d*' which are then connected in series with winding 14*d* on core S14. The R9 path also has a branch through winding 15*d* on core S15. Therefore, a large opposing voltage is induced in the R9 path if a voltage is induced in winding 15*d* (as a result of digit D being equal to 1) and if at the same time a voltage is induced in either winding 14*d* (as a result of digit C being equal to 1) or in each of the two windings, 13*d*' and 12*d* (as a result of digit A being equal to 1 and digit B being equal to 0). Note that if these conditions are satisfied and a large opposing voltage is induced in the R9 path, only small voltages corresponding to $\Delta\phi$—0 in Fig. 1 will be induced in the R10 path. This is because the R10 path has one branch through the series connection of windings 12*d*' and 13*d* and another branch through winding 14*d*'. These two branches then combine and pass through winding 15*d*'. In the example of Fig. 9 it is a necessary condition that digit D be equal to 1 in the event that the S16 pair is to be set to 1. In this case a small voltage will be induced in 15*d*'. Also, for the S16 pair to be set to 1 it is necessary that C be equal to 1 or that A be equal to 1 with B equal to 0. If C is equal to 1, more than half of the driving current can flow readily through the R10 path because of the relatively small induced voltage in 14*d*'. If A is equal to 1 with B equal to 0, more than half of the current can flow in the R10 path because a relatively small voltage will be induced in the branch containing 12*d*' and 13*d***.

In the cases where the digit shifted to the S16 pair is to be a 0, a relatively large opposing voltage will be induced in the R10 path rather than in the R9 path. If the digit is to be a 0, it must be that either D is 0 (and therefore a relatively large voltage will be induced in **15*d*' and not in 15*d*) or else C is 0 (and therefore a relatively large voltage will be induced in 14*d*' and not in 14*d*) and at the same time either A is 0 or B is 1 (and therefore a relatively large voltage will be induced in the branch of the R10 path which includes 12*d*' and 13*d*, but that part of the R9 path which includes 12*d* and 13*d*'** will allow a large current to pass because one or the other, or both, of these branches will have only a relatively small voltage induced in it).

Diodes D11 and D12 block the flow of circulating current in the circuit loop composed of windings **12*d* and 13*d*'. Diode D13 in combination with diodes D11 and D12 block the flow of circulating current in the circuit loop composed of windings 15*d*, 14*d*, and the parallel combination of 12*d* and 13*d*'. Diodes D14 and D15 block the flow of circulating current in the circuit loop composed of windings 12*d*', 13*d*, and 14*d*'**.

It should be understood that the circuit of Fig. 9 is only an example, and that the invention can be applied in a straightforward manner to any logical function consisting of "or" functions, "and" functions, and inversions. The rules for connecting the windings are as follows:

(1) For an "or" function connect the *d* windings of the corresponding core pairs in series and the *d'* windings of the same core pairs in parallel.

(2) For an "and" function connect the *d* windings of the corresponding core pairs in parallel and the *d'* windings of the same core pairs in series.

(3) For each input variable that is to be inverted, interchange the roles of the corresponding *d* and *d'* windings in rules 1 and 2, and if the function as a whole is to be inverted, interchange the connections of the two paths at the input windings of the core pair to which the digits are being shifted.

Figure 10:
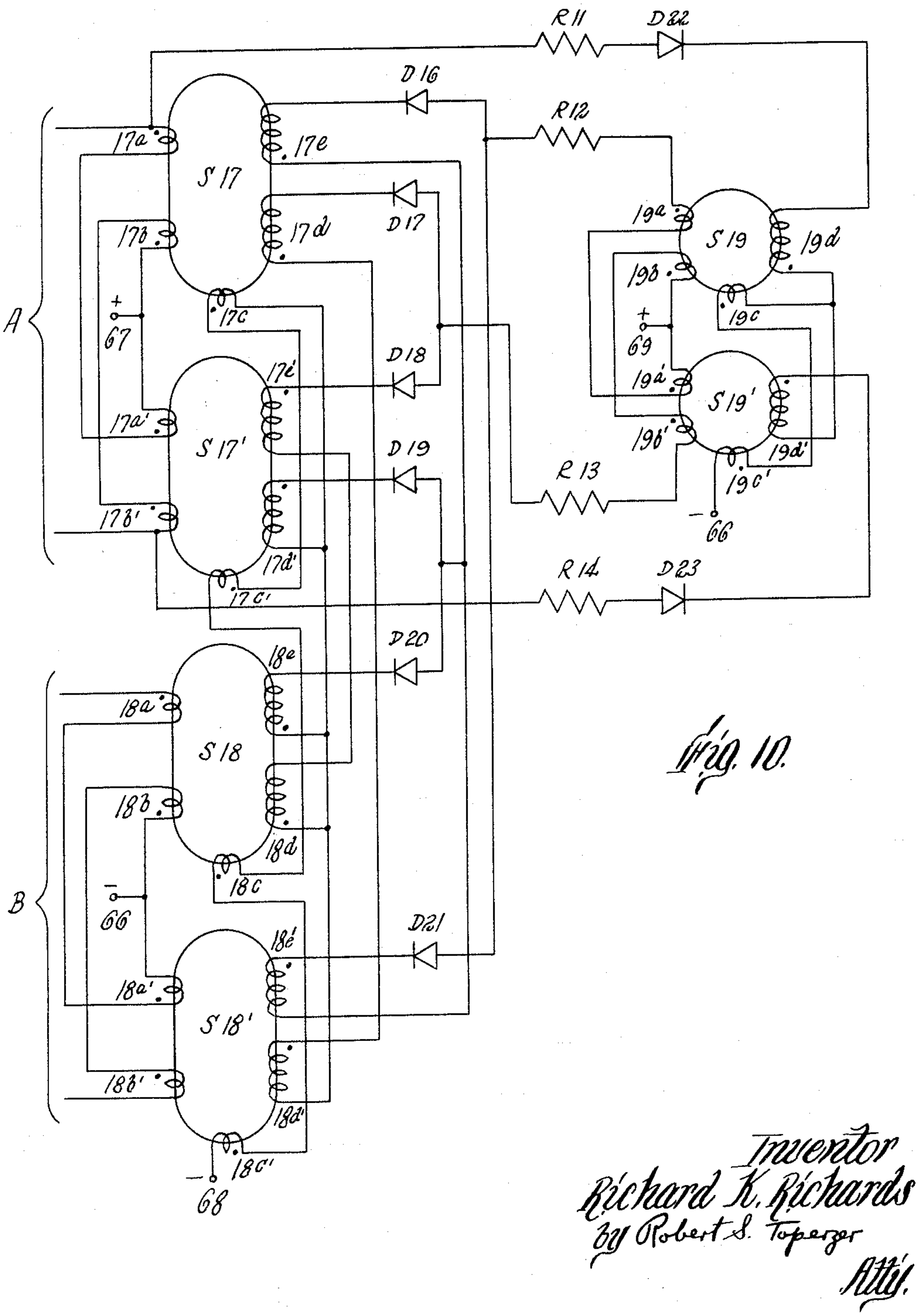
Fig. 10 shows, by way of example, a circuit to accomplish a logical function wherein one or more of the input variables must be used more than once in forming a function, also in accordance with the invention.

With the circuits described up to this point, if in the expression for the logical function to be performed an input variable appears more than once, it would be necessary to provide a separate input core pair for each occurrence of the variable. The logical function, $A\bar{B}+\bar{A}B$, is a simple and commonly encountered example of such an expression. In this example the variables A and B each appear twice. By placing extra windings on core pairs corresponding to variables appearing more than once, it is possible to obtain the desired function with only one core pair for each variable. The circuit in Fig. 10 shows how this result is accomplished in the case of the example cited. Variables A and B may be assumed to have been entered into core pairs S17 and S18, respectively. The *e* and *e'* windings are the added windings in this circuit, and they function in exactly the same manner as the *d* and *d'* windings. The fact that the cores are drawn with an elongated shape is only for purposes of improving the clarity of the drawing, and it should not be construed that there are necessarily any differences in the core structure.

In the circuit of Fig. 10 digits A and B in core pairs S17, and S18, respectively, are to be shifted to core pair S19 so that the function $A\bar{B}+\bar{A}B$ is performed or in other words so that the S19 pair is set to 1 if A is 1 and B is 0 or if A is 0 and B is 1, or in still other words so that the S19 pair is set to 1 if one and only one of the two variables, A and B, is 1. The shifting is accomplished by the application of a driving pulse to terminals 68 and 69 with the relatively positive potential at terminal 69. As before, two paths are available for the flow of driving current. One path proceeds from terminal 69 through **19*a*', 19*a***, R12, the parallel combination of 17*e* and 18*e'*, the parallel combination of 17*d'* and 18*e*, and then through the series connection of 17*c*, 17*c'*, 18*c*, and 18*c'* to terminal 68. The other path proceeds from terminal 69 through 19*b*, 19*b'*, R13, and then this path branches with one branch consisting of the series connection of 17*d* and 18*d'* and with the other branch consisting of the series connection of 17*e'* and 18*d*. The two branches then combine and join the first path in proceeding through 17*c*, 17*c'*, 18*c*, and 18*c'* to terminal 68.

In Fig. 10, if both A and B are 0 at the time of the driving pulse, a relatively large voltage will be induced in windings 17*e'*, 17*d'*, 18*e'*, and 18*d'*. Hence a relatively large opposing voltage will be induced in both branches of the R13 path, but driving current will be able to flow freely through those parts of the R12 path that include 17*e* and 18*e*. With more than half of the current in this path, core pair S19 will be set to 0. If A and B are both 1, a similar siutation exists except that the driving current will flow through those parts of the R12 path that include 18*e'* and 17*d'*. If A is equal to 1 and B is equal to 0, relatively large voltages will be induced in windings 17*e* and 18*e'*, and the flow of current in the R12 path will be opposed, but a relatively small opposition to the flow of current will be present in the branch of the R13 path that includes 17*e'* and 18*d*. Core pair S19 will then be set to 1. Similarly, if A is equal to 0 and B is equal to 1, the flow of current in the R12 path will be opposed by relatively large voltages induced in windings 17*d'* and 18*e*, but current can flow relatively freely in that branch of the R13 path that includes 17*d'* and 18*d'* so that core pair S19 will be set to 1 in this case also.

Further, in Fig. 10 it is possible to shift the digit stored in pair S19 to pair S17 by applying a driving pulse to terminals 66 and 67 with the relatively positive potential at terminal 67. The shifting circuit between these two core pairs is exactly the same as the shifting circuit in Fig. 4. If the digit in pair S18 is always a 0, a digit (either a 0 or a 1) can be shifted back and forth between pairs S17 and S19 by applying driving pulses alternately between terminals 68 and 69 for shifting from pair S17 to S19 and between terminal 66 and 67 for shifting from pair S19 to S17. If at the time a digit is being shifted from S19 to S17 a binary 1 is entered into core pair S18, the next occurence of a driving pulse at terminals 68 and 69 will have the effect of inverting the digit being shifted back and forth between pairs S17 and S19. This effect is a result of the fact that the digit shifted into S19 is equal to $A\bar{B}+\bar{A}B$, that is if a 1 is present in pair S17, a 1 in pair S18 will cause a 0 to be entered into pair S19 whereas, if a 0 is present in S17, a 1 in S18 will cause a 1 to be entered into pair S19. The operation of this circuit is therefore analogous to that of a complementing flip-flop, which is a common circuit in many applications, where a "complementing flip-flop" implies a binary storage device that changes to its opposite state of equilibrium when an input signal is received.

Figure 11:
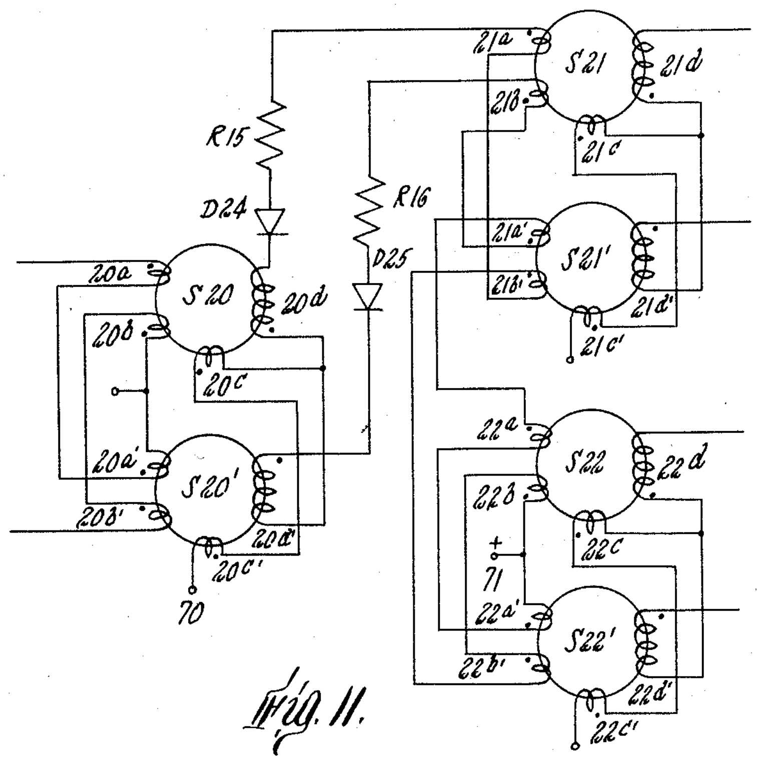
Fig. 11 shows a circuit according to the invention wherein two output stages are driven by a single input stage.

Fig. 11 shows a circuit that can be used when the binary digit in one core pair is to be shifted to two other core pairs. In this case the digit in pair S20 is to be shifted to pairs S21 and S22 by the application of a driving pulse at terminals 70 and 71 with the relatively positive potential at terminal 71. The functioning of the circuit is substantially the same as that of Fig. 4 except each path includes the input windings of both core pairs to which the digit is being shifted. In particular, one path passes through the series connection of 22*b*, 22*b'*, 21*b'* and 21*b* and then through R16 etc., while the other path passes through the series connection of 22*a'*, 22*a*, 21*a'*, and 21*a* and then through R15, etc. Because of the series connection, the effect on both the S21 and S22 core pairs is the same. This circuit can be adapted for shifting to three or more core pairs in a straightforward manner, and this circuit can also be combined with circuits to perform logical operations in a straightforward manner.

Figure 12:
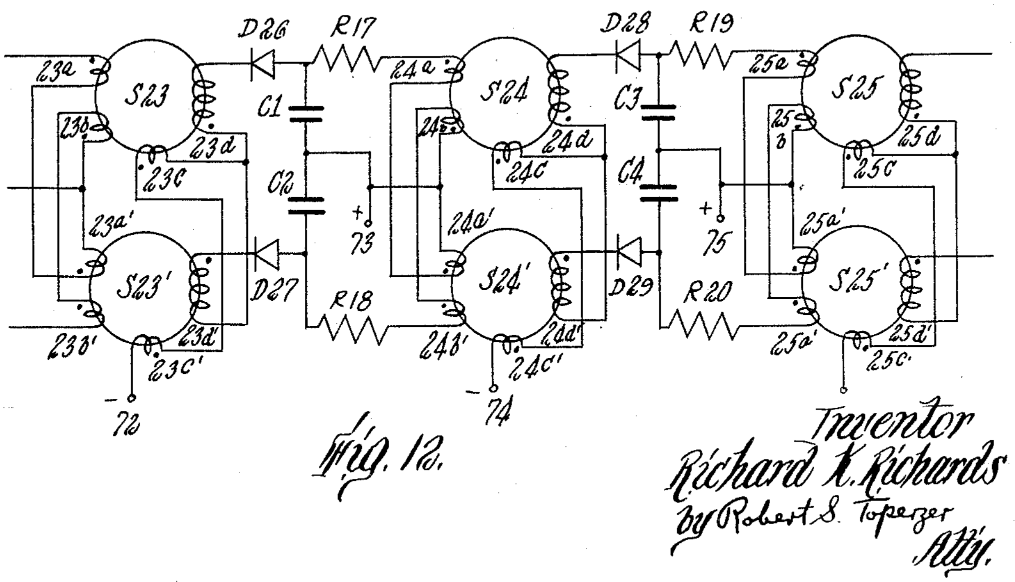
Fig. 12 shows an embodiment of the invention wherein successive binary digits are separated by only one stage.

For an understanding of the shifting circuit in Fig. 12, assume that a driving pulse is applied to terminals 72 and 73 with the relatively position potential applied to terminal 73. In this circuit the path for the driving current will be either from terminal 73 through condenser C1, diode D26, winding 23*d*, and then through the series connection of windings 23*c* and 23*c'* to terminal 72 or from terminal 73 through condenser C2, diode D27, winding 23*d'*, and then through the series connection of 23*c* and 23*c'* to terminal 72. As before, a relatively large opposing voltage will be induced in 23*d* or 23*d'* in accordance with whether the digit in pair S23 is a 1 or a 0, respectively. Assume that this digit is a binary 1. In this case, the flow of current will be through the path containing C2. Condenser C2 will become charged with the relatively positive electrode being the electrode connected to terminal 73. Some current will flow from terminal 73 through the path consisting of windings 24*b* and 24*b'*, resistor R18, and then through D27, etc., but this current can be neglected during the time of the driving pulse because the resistance of R18 will cause it to be small relative to the current through C2. However, after the driving pulse has been terminated, condenser C2 will discharge through the circuit path of windings 24*b* and 24*b'* and resistor R18. The direction of the current in the windings on the S24 pair is such that the S24 pair is set to 1. In a similar manner, if a 0 had been in the S23 pair, the path for the driving current would have been through C1 so that this condenser would have become charged. Condenser C1 would then discharge through R17 and windings 24*a* and 24*a'* in a direction to cause the S24 pair to be set to 0.

With the shifting circuit of Fig. 12 diodes D26 and D27 are necessary and not just an improvement. They are needed to prevent the discharge of one condenser through the path which includes the other condenser and windings 23*d* and 23*d'*. Also, with this form of shifting circuit, the driving pulse must not be maintained after a voltage has been induced in the *d* or *d'* winding (as the case may be) because if it is maintained, current will then flow in both paths equally and cause both condensers to become charged to the same voltage. Accordingly, when the condensers discharge, there will be no net M.M.F. in either direction in the S24 pair, and it will not be possible to set this pair to the state representing the desired binary digit.

In view of the fact that the digit originally in pair S23 is transferred to the condenser pair consisting of C1 and C2 before the digit is entered into core pair S24, it is possible to shift the digit in the S24 pair to the S25 pair at the same time that a digit is being shifted from the S23 pair to the S24 pair. The functioning of the shifting circuit between the S24 and S25 pairs is exactly the same as that of the circuit between the S23 and S24 pairs. With this arrangement only one half as many cores are required for each binary digit in a shifting register.

The circuit in Fig. 12 may be adapted to "or" functions, "and" functions, inversions, and combinations of these functions by means which are directly analogous to those of the previously described shifting circuits.

Figure 13:
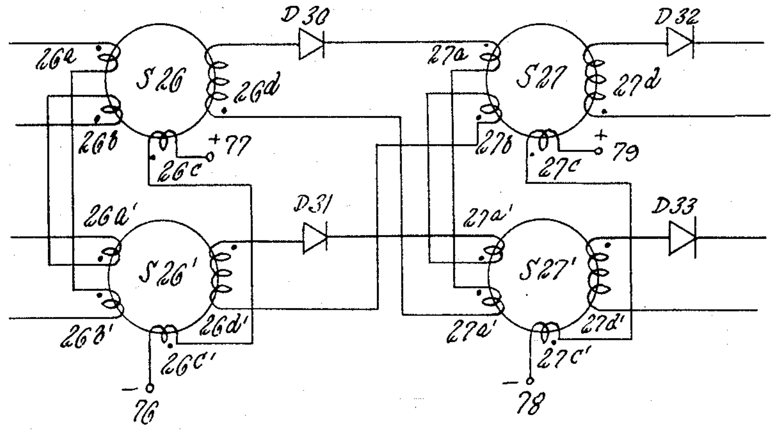
Fig. 13 shows another modification of the shifting register of Fig. 3, in accordance with the invention.

In the shifting circuit of Fig. 13 a binary digit in core pair S26 is shifted to pair S27 by applying a driving pulse to terminals 76 and 77 with the relatively positive potential at terminal 77. The difference between the functioning of this circuit and the functioning of the circuit in Fig. 4 is that an induced voltage in the *d* or *d'* winding (as the case may be) causes current flow in the appropriate input windings of the S27 pair in a direct fashion rather than by controlling the path of the flow of driving current. Specifically, if the digit in the S26 pair is a 1, the relatively large voltage induced in 26*d* causes a current to flow through D30, 27*a*, and 27*b'* in a direction which causes the S27 pair to be set to 1. If the digit in the S26 pair is a 0, the larger voltage will be induced in 26*d'*, and the resulting current through D31, 27*a'*, and 27*b* will cause the S27 pair to be set to 0.

If the turns ratio between the *d* windings and the *a* and *b* windings is made sufficiently great, it is possible to eliminate diodes, but since diodes D30 and D31 serve the additional purpose of preventing circulating currents in their respective circuit loops, it is preferred to include them. For example, diode D30 prevents the flow of current in the loop containing 26*d*, 27*a*, and 27*b'* at the time when S26, S27, or S27' is being set as a result of currents in other windings on these cores.

Figure 14:
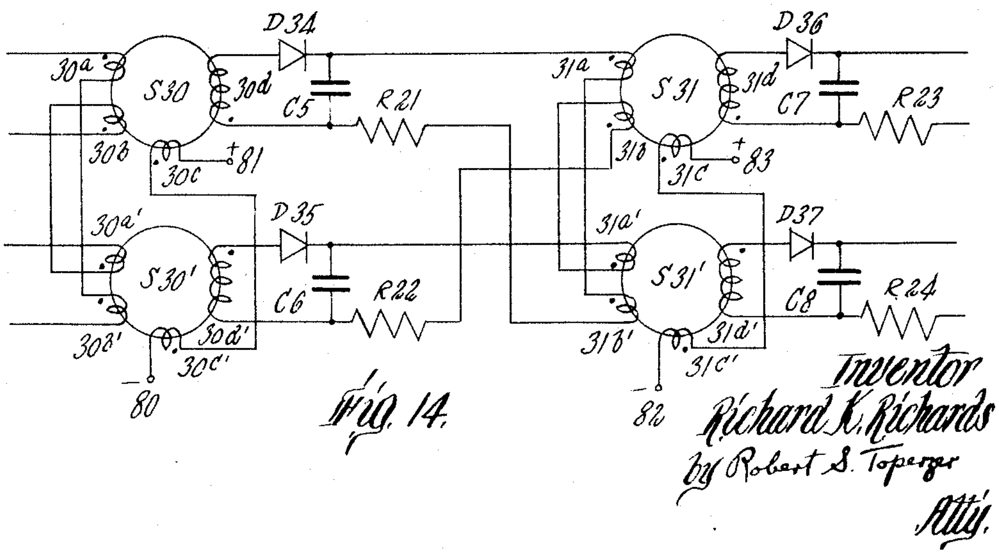
Fig. 14 shows a modification of the circuit of Fig. 12, according to the invention.

The operation of the circuit of Fig. 14 is similar to that of Fig. 12 in that the digits are stored temporarily in condensers when being shifted from one core pair to the next, and it is also similar to that of Fig. 13 in that the signal from one core pair to the next is derived directly from the induced voltages rather than by control of the path of the driving current. If core pair S30 contains a 1 at the time the driving pulse is applied, a relatively large voltage will be induced in winding 30*d*. This voltage will cause current flow through D34 to condenser C5. Because of resistor R21, the current through the branch containing 31*a*, 31*b'*, and R21 will be relatively small and can be neglected. As a result of the current through D34, condenser C5 will become charged with the relatively positive electrode being connected to the dot terminal of 31*a*. After the driving pulse has terminated, C5 will discharge through the path containing 31*a*, 31*b'* and R21 and will cause the S31 pair to be set to 1. At the time of the driving pulse, a relatively small voltage will be induced in 30*d'*. Condenser C6 will become charged in a similar fashion, but the amount of charge will be substantially less. When condenser C6 discharges through 31*a'*, 31*b*, and R22, the direction of the M.M.F. created by this discharge current will oppose the M.M.F. produced by the discharge current of condenser C5, but because the latter current is much larger, the desired setting of the cores will not be impaired. If, on the other hand, the digit in the S30 pair is a 0, the relatively larger voltage will be induced in winding 30*d'* with the result that the voltage on condenser C6 will be larger than the voltage on C5, and hence the S31 pair will be set to 0.

It has been found that although the circuits of Figs. 13 and 14 contain certain simplifications with regard to shifting register operation, they are less adaptable to the performance of logical functions than the shifting circuits of the type shown in Figs. 3, 4, and 12.

Figure 15:
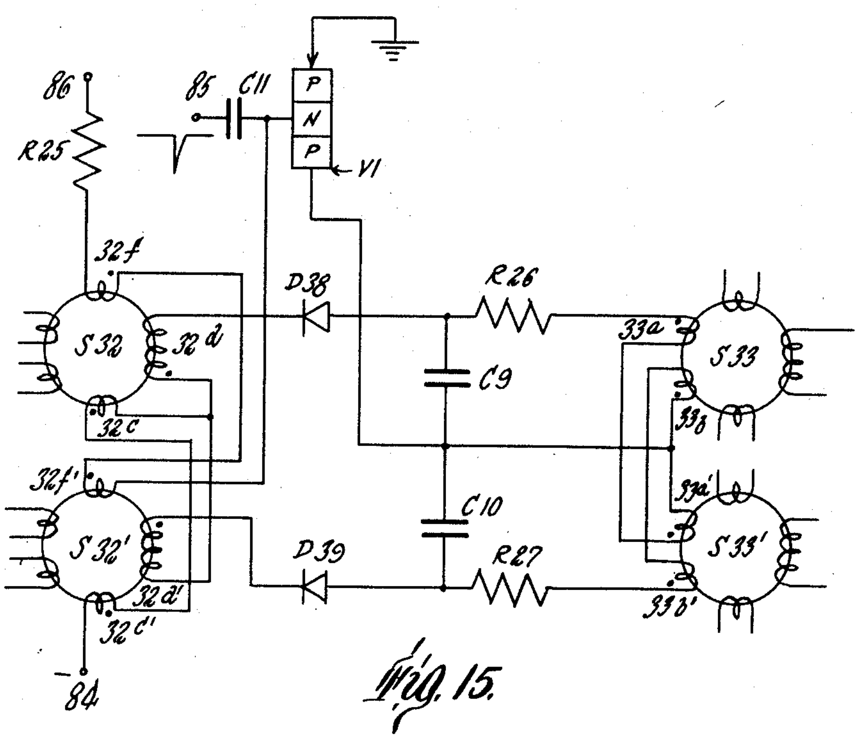
Fig. 15 shows, by way of an example, a feedback type of driving circuit which can be used to generate the driving pulses needed to operate the shifting circuits according to the invention.

The shifting circuit of Fig. 15 is exactly the same as the shifting circuit of Fig. 12 except that a transistor driver has been added. In Fig. 15 terminal 84 is connected to a negative supply voltage, the magnitude of which is selected to be a suitable collector supply voltage for transistor V1 which is of the P–N–P junction type. The junction of condensers C9 and C10 (which corresponds to terminal 73 in Fig. 12) is connected to the collector of the transistor. The emitter of the transistor is connected to ground. The base of the transistor is connected through the series connection of windings 32*f'* and 32*f* (on cores S32' and S32, respectively) and through resistor R25 to a bias supply voltage at terminal 86. For purposes of explanation it may be assumed that the bias voltage is slightly positive with respect to ground potential so that the transistor will be held in a cut-off condition, although in practice it may be found that a slightly negative bias voltage is preferable to allow a small amount of conduction in the transistor. A small amount of initial conduction is desirable because it allows the use of smaller input pulses, but the initial conduction should not be so great that the regenerative action to be explained becomes initiated without an input pulse.

To shift a binary digit from the S32 pair to the S33 pair, a negative pulse is applied at terminal 85. This pulse passes through condenser C11 to the base of the transistor. The amplitude of the pulse is chosen to be great enough to cause conduction from the emitter to the base of the transistor. Because of transistor action, a current can then flow from the base to the collector and its load. The collector load is the shifting circuit as described previously. Since one or the other of the two cores in the S32 pair will have its magnetic state reversed by the driving current from the collector, a voltage will be induced in one or the other of the two windings, 32*f'* and 32*f*. Since this induced voltage is relatively positive at the no-dot terminal and negative at the dot terminal of winding 32*f*, but of reversed polarity relative to the dot in winding 32*f'*, it may be observed from the figure that the effect of this induced voltage is to hold the base of the transistor at a negative potential with respect to the emitter. Because of this feedback action, it is possible to employ a small amplitude and short duration pulse at terminal 85 to perform the shifting action.

The induced voltage is fed back to the base of the transistor as long as the flux continues to change in the core which is being changed in state. When the flux in the core has been reversed, there is no longer any voltage induced in the base circuit, and the transistor is then returned to the cut-off condition because the input pulse will have been terminated by this time. Besides permitting the use of small pulses at terminal 85, the driving circuit of Fig. 15 has an advantageous self-timing feature. It has already been pointed out that the duration of the driving current for a shifting circuit of this type should not be longer than necessary to reverse the flux in one of the cores, and the fact that the feedback voltage terminates at the time that the flux reversal process is completed produces this result.

The driving circuit shown in Fig. 15 is applicable to any of the other shifting circuits which have been described. Specifically, it is applicable to the circuits of Figs. 3, 4, 13 and 14 as well as the circuit of Fig. 12. Innumerable variations in the circuit are possible. The distinguishing feature of the circuit is that the feedback voltage is obtained in a fashion such that the resetting of either core in the pair produces the feedback. When the feedback driving circuit is applied to shifting circuits performing logical functions where more than one pair of input cores are involved (as in Figs. 5, 6, 9 and 10), the feedback voltage can be obtained from any one of the input pairs because on each step of shifting, one core in each pair will be reversed in state.

Figure 16:
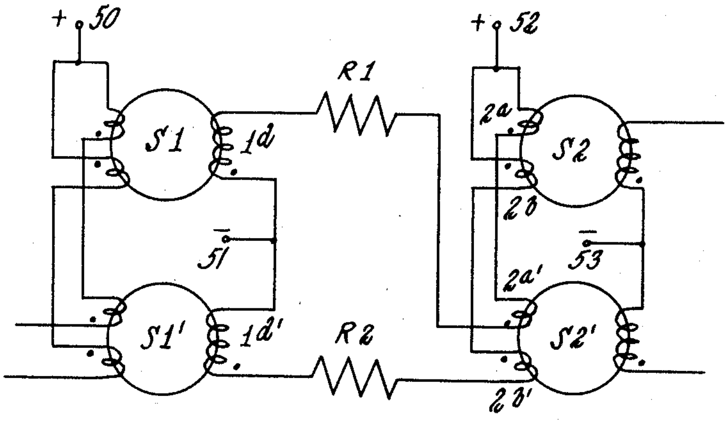
Fig. 16 shows a modification of the circuit of Fig. 3 with certain windings omitted according to the invention.

In Fig. 16 there is shown an embodiment of the invention which is the same as that of Fig. 3 except for the fact that the driving windings have been omitted and the *d* windings connected directly to negative terminal 51. If the number of turns on the *d* windings is made sufficiently great, the self inductance of these windings, or in particular the windings whose core is reversed in state, will be large enough in itself to control the flow of driving current. Thus, assuming that the S1 pair has been initially set to 1, a relatively large voltage will be self-induced in winding 1*d* when the driving voltage is applied so that most of the driving current is caused to flow through the 2*b* and 2*b'* windings of the S2 core pair as required to set them to 1. After the S2 core pair has been set to 1, the driving current will then reset the S1 core pair and in this way the *d* windings are made to serve both as output windings and as transfer windings. Further, it will be observed that the time duration of the transfer or driving voltage is not at all critical so long as it is maintained long enough to permit resetting of the S1 core pair. Thereafter, the current divides equally between the R1 and R2 paths and hence cannot affect the setting of the S2 pair.

The circuits of this invention are not limited to the generation of a single logical function when shifting from a given set of core pairs. One example of the generation of two logical functions is shown in Fig. 7. The pulse of driving current is applied between terminals 87 and 89. It may be observed that the portion of the circuit between terminal 87 and point 88 in the circuit (which includes **26*a*, 36*b*, 36a′, 36*b*′, R41, R42, D41, D42, D43, 34*d*, 34*d*′, 35*d*′, 34*c*, 34*c*′, 35*c* and 35*c*′) is an "or" circuit of substantially the same form as shown in Fig. 5. If the digits in the S34 and S35 core pairs are A and B, respectively, the digit representing the function A "or" B will be shifted into the S36 core pair. That portion of the circuit between terminal 89 and point 88 (which includes 37*a*, 37*b*, 37*a*′, 37*b*′, R43, R44, D44, D45, D46, 34*e*, 34*e*′, 35*e*, and 35*e*′**) is in series with the first-mentioned portion and is substantially the same as the "and" circuit in Fig. 6. The *c* and *c*′ windings need not be duplicated because the change in flux in a core will induce voltages in all windings on a core. The digit shifted into the S37 core pair will represent the function A "and" B.

Figure 17:
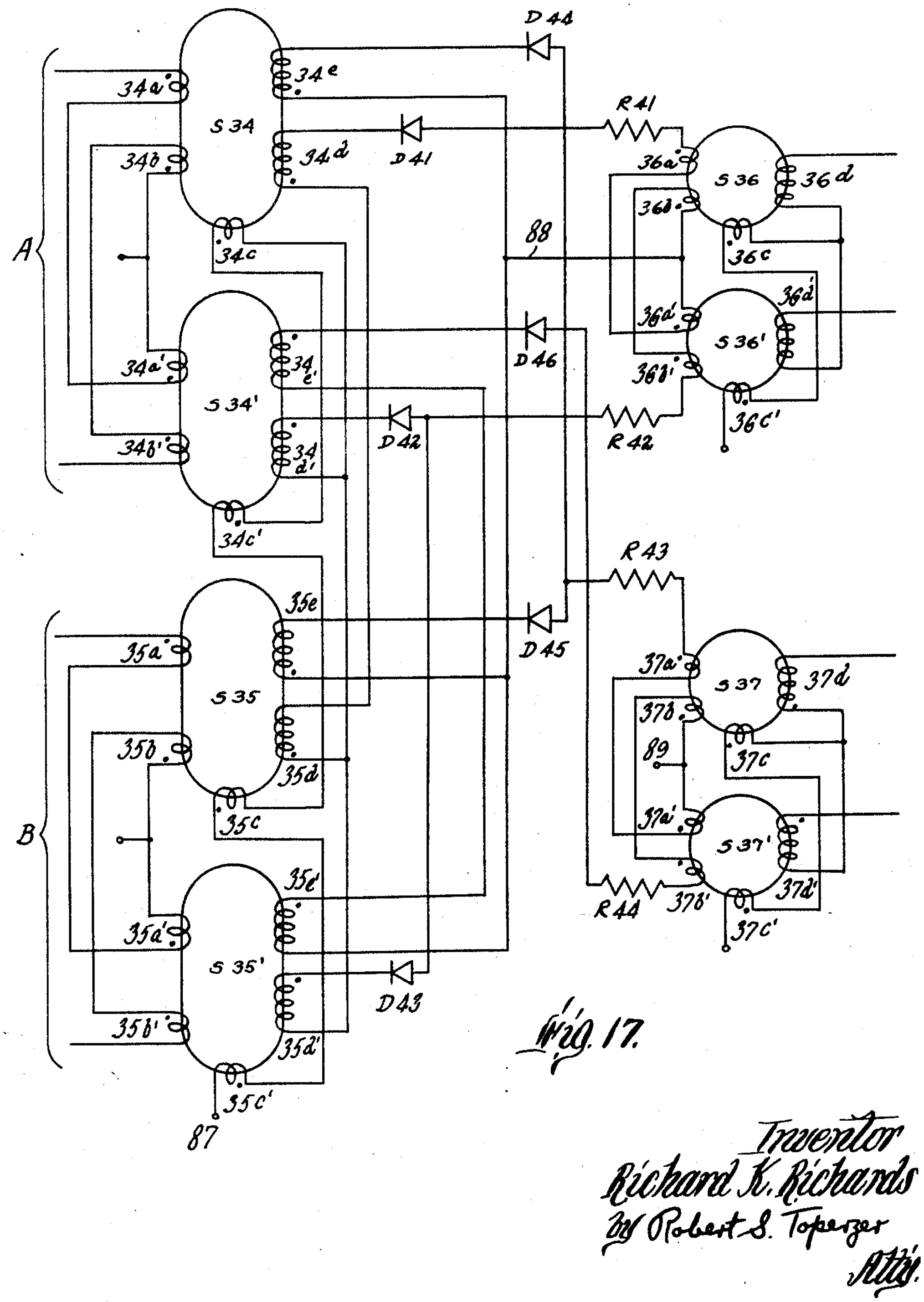
Fig. 17 shows an application of the circuit of Fig. 4 to generating certain logical functions also in accordance with the invention.

The arrangement in Fig. 17 can be extended in a straightforward manner to include three or more functions, to include three or more input signals for one or more of the functions, and to include more complex combinations of functions. Also, other variations in the shifting circuit which have been described can be adapted in a straightforward manner to the performance of two or more logical functions when shifting from a given set of cores.

It is to be understood, therefore, that the above-described circuits are merely illustrative of applications of the principles of this invention and that numerous other arrangements may be devised by those skilled in the art without departing from the spirit and scope of this invention.

What is claimed is:

1. A magnetic core circuit including a first pair of saturable magnetic cores, input windings and transfer windings on said cores to control the magnetic states thereof, means to apply a binary input signal to said input windings to saturate each of said cores with flux in a direction determined by the binary sense of said input signal, means to apply a transfer signal to said transfer windings to magnetize one of said cores in a fixed direction corresponding to the direction of the flux produced by said input signals and to saturate the other of said cores with flux in a fixed direction opposite to that of the flux produced by the said input signal, an output winding on each of said cores, said output windings being adapted to provide induced voltages representing the changes in the magnetic states of said cores produced by said transfer signal when the initial magnetic states of said cores have been predetermined by said input signal, a second pair of saturable magnetic cores, an input winding on each core of said second pair of cores connected in circuit with the output winding on one core of said first pair of cores, and another input winding on each core of said second pair of cores connected in circuit with the output winding on the other core of said first pair of cores, said input windings on the cores of said second pair being adapted to magnetize the latter in directions corresponding to the initial magnetic states of said first pair of cores in response to said induced voltages.

2. A magnetic core circuit according to claim 1 further including a pair of rectifying elements connected in circuit with said output windings, respectively.

3. A magnetic core circuit according to claim 1 further including a pair of rectifying elements each being connected between an output winding on said first pair of cores and an input winding on said second pair of cores in circuit therewith, a pair of resistive elements each being connected in series with one of said rectifying elements and one of said output windings, and a pair of capacitive elements each being connected across the series combination of one of said rectifying elements and one of said output windings.

4. A magnetic core circuit including a first pair of saturable magnetic cores, input windings on said first pair of cores to control the magnetic states thereof, means to apply a binary input signal to said input windings to set said first pair of cores by saturating each of them with flux in a direction determined by the binary sense of said input signal, a transfer winding on each core of said first pair of cores, said transfer windings being responsive to a transfer signal to reset said first pair of cores by magnetizing one of them in a fixed direction corresponding to the direction of the flux produced by said input signal and saturating the other of them with flux in a fixed direction opposite to that of the flux produced by said input signal, a second pair of saturable magnetic cores, an input winding on each core of said second pair of cores connected in series combination with the transfer winding on one core of said first pair of cores, another input winding on each core of said second pair of cores connected in series combination with the transfer winding on the other core of said first pair of cores, and means to apply a transfer signal across said series combinations of input and transfer windings to reset said first pair of cores and to magnetize said second pair of cores in directions corresponding to the initial magnetic states of said first pair of cores as predetermined by said input signal.

5. A magnetic core circuit including a first pair of saturable magnetic cores, input windings on said first pair of cores to control the magnetic states thereof, means to apply a binary input signal to said input windings to set said first pair of cores by saturating each of them with flux in a direction determined by the binary sense of said input signal, transfer windings on said first pair of cores to reset them in response to a transfer signal by magnetizing one of said cores in a fixed direction corresponding to the direction of the flux produced by said input signal and saturating the other of said cores with flux in a fixed direction opposite to that of the flux produced by said input signal, output windings on said first pair of cores adapted to provide induced voltages representing the changes in the magnetic states of said first pair of cores, a second pair of saturable magnetic cores, an input winding on each core of said second pair of cores connected in series combination with the output winding on one core of said first pair of cores, another input winding on each core of said second pair of cores connected in series combination with the output winding on the other core of said first pair of cores, and means to apply a transfer signal to said transfer windings and across said series combinations of said input and output windings to reset said first pair of cores and to magnetize said second pair of cores in directions corresponding to the initial magnetic states of said first pair of cores as predetermined by said input signal.

6. A magnetic core circuit including a first pair of saturable magnetic cores, input windings on said first pair of cores to control the magnetic states thereof, means to apply a binary input signal to said input windings to set said first pair of cores by saturating each of them with flux in a direction determined by the binary sense of said input signal, transfer windings on said first pair of cores to reset them in response to a transfer signal by magnetizing one of said cores in a fixed direction corresponding to the direction of the flux produced by said input signal, and saturating the other of said cores with flux in a fixed direction opposite to that of the flux produced by said input signal, output windings on said first pair of cores adapted to provide induced voltages representing the changes in the magnetic states of said first pair of cores, a second pair of saturable magnetic cores, an input winding on each core of said second pair of cores connected in series combination with the output winding on one core of said first pair of cores, another input winding on each core of said second pair of cores connected in series combination with the output winding on the other core of said first pair of cores, said series combinations of input and output windings being connected to parallel relation to one another between a first terminal and an intermediate point common to said output windings, and said transfer windings being connected in series with one another between a second terminal and said intermediate point, and means to apply a transfer signal across said terminals to reset said first pair of cores and magnetize said second pair of cores in directions corresponding to the initial magnetic states of said first pair of cores as predetermined by said input signal.

7. A magnetic core circuit including first and second pairs of saturable magnetic cores, a transfer winding, an output winding, and a pair of input windings on each of said cores, a first current path including the series combination of one input winding on each core of said said second pair of cores and the output winding on one core of said first pair of cores, a second current path including the series combination of the other input winding on each core of said second pair of cores and the output winding on the other core of said first pair of cores, a first terminal connected to one end of each path, a second terminal connected to the other end of each path through the series combination of said transfer windings on said first pair of cores, means to apply a binary input signal to a selected one of said input windings on each core of said first pair of cores according to the binary sense of said input signal, said input windings being adapted to saturate said first pair of cores with flux in directions corresponding to the binary sense of said input signal, and means to apply a transfer signal across said terminals, said transfer windings on said first pair of cores being responsive to said transfer signal to magnetize one core of said first pair of cores in a fixed direction corresponding to the direction of the flux produced by said input signal and to saturate the other core of said first pair of cores with flux in a fixed direction opposite to that of the flux produced by said input signal, and said output windings on the cores of said first pair being responsive to the changes in the magnetic states of said first pair of cores when their initial states have been predetermined by said input signal to limit the current flow in one of said paths and to cause said second pair of cores to be magnetized in directions corresponding to the initial states of said first pair of cores.

8. A magnetic core circuit according to claim 7 further including a third pair of saturable magnetic cores, an input winding on each core of said third pair of cores disposed in said first current path, and another input winding on each core of said third pair of cores disposed in said second current path.

9. A magnetic core circuit according to claim 7 further including a resistive element disposed in each of said current paths between said input and output windings on the cores of said first and second pair.

10. A magnetic core circuit according to claim 9 further including a rectifying element connected in series with each of said resistive elements.

11. A magnetic core circuit according to claim 10 further including a pair of capacitive elements connected from said first terminal to the respective junctions of said resistive and rectifying elements in said paths.

12. A magnetic core circuit according to claim 11 wherein said means to apply a transfer signal across said terminals includes a transistor having emitter, collector and base electrodes, said transfer signal being impressed across said base and emitter electrodes, a source of biasing potential for said base electrode, a feedback winding on each of said first pair of cores, said feedback windings being connected in series with one another between said base electrode and said biasing potential sources, and a source of supply voltage for said collector electrode, said collector being connected to said first terminal and said supply voltage source being connected between said second terminal and said emitter electrode.

13. A magnetic core circuit including first, second and third pairs of saturable magnetic cores, a transfer winding, an output winding, and a pair of input windings on each of said cores, a first current path including the series combination of two input windings, one on each core of said third pair and two output windings, one on a core in said first pair and one on a core in said second pair, a second current path including the series combination of the other input windings on said third pair of cores, a pair of branch paths connected between said second current path and said first current path, said branch paths including the other output windings on each of said first and second pair of cores, a first terminal connected to the free ends of said first and second paths, a second terminal connected to the common ends of said first path and said branch paths through the series combination of the transfer windings on said first and second pair of cores, means to apply a first binary input signal to a selected one of said input windings on each core of said first pair of cores according to the binary sense of said first input signal, said input windings on said first pair of cores being adapted to saturate the latter with flux in directions corresponding to said first input signal, means to apply a second binary input signal to a selected one of the input windings on each core of said second pair of cores according to the binary sense of said second input signal, said input windings on said second pair of cores being adapted to saturate the latter with flux in directions corresponding to said second input signal, and means to apply a transfer signal across said terminals, said transfer windings on said first and second pair of cores being responsive to said transfer signal to magnetize one core of each pair in a fixed direction corresponding to the direction of the flux produced by said input signals and to saturate the other core of each pair with flux in a fixed direction opposite to that of the flux produced by said input signals, and said output windings on said first and second pair of cores being responsive to the changes in the magnetic states of said cores when their initial states have been predetermined by said input signals to cause said third pair of magnetic cores to be magnetized in directions corresponding to a predetermined combination of said input signals.

14. A magnetic circuit according to claim 13 further including a resistor and a rectifying element in said first current path, a resistor of like value in said second current path, and a rectifying element in each of said branch paths.

References Cited in the file of this patent

UNITED STATES PATENTS

| | | |
|---|---|---|
| 2,680,819 | Booth | June 8, 1954 |
| 2,769,925 | Saunders | Nov. 6, 1956 |

UNITED STATES PATENT OFFICE

CERTIFICATE OF CORRECTION

Patent No. 2,935,738 May 3, 1960

Richard K. Richards

It is hereby certified that error appears in the printed specification of the above numbered patent requiring correction and that the said Letters Patent should read as corrected below.

Column 1, line 64, for "obteaining" read -- obtaining --; column 4, line 51, for "creating and" read -- creating an --; column 7, line 47, for "(R1, R2, R3 etc.)" read -- ($R_1$, $R_2$, $R_3$ etc.) --; column 14, line 5, for "position" read -- positive --; column 17, line 6, for "Fig. 7" read -- Fig. 17 --; line 10, for "26a" read -- 36a --; column 20, line 9, for "sources" read -- source --; column 20, line 25, strike out "each of".

Signed and sealed this 1st day of November 1960.

(SEAL)
Attest:
KARL H. AXLINE
Attesting Officer

ROBERT C. WATSON
Commissioner of Patents